United States Patent [19]

Aihara et al.

[11] Patent Number: 4,805,866
[45] Date of Patent: Feb. 21, 1989

[54] POWERED SEAT SLIDE DEVICE

[75] Inventors: Tsutomu Aihara, Yokohama; Yasuo Hirama; Hiroaki Iwamoto, both of Kanagawa, all of Japan

[73] Assignees: Ikeda Bussan Co., Ltd., Ayase; Ohi Seisakusho Co., Ltd., Yokohama, both of Japan

[21] Appl. No.: 78,705

[22] Filed: Jul. 28, 1987

[30] Foreign Application Priority Data

Jul. 31, 1986 [JP] Japan .................. 61-181032

[51] Int. Cl.4 ............................................... B60N 1/08
[52] U.S. Cl. .................................... 248/429; 297/346
[58] Field of Search ............... 248/429, 430, 419, 424, 248/393, 397, 420; 297/330, 346

[56] References Cited

U.S. PATENT DOCUMENTS 3,184,209 5/1965 Colautti .................... 248/429
3,232,575 2/1966 Ferro ....................... 248/430

FOREIGN PATENT DOCUMENTS 56-29235 7/1981 Japan .
57-47225 10/1982 Japan .

Primary Examiner—Alvin C. Chin-Sue
Attorney, Agent, or Firm—Foley & Lardner, Schwartz, Jeffery, Schwaab, Mack, Blumenthal & Evans

[57] ABSTRACT

Herein disclosed is a powered seat slide device which comprises a threaded shaft which is neatly received in an elongate tunnel-like space defined between coupled movable and stationary rails and rotatably held by the movable rail, a nut which is received in the tunnel-like space to be operatively engaged with the threaded shaft and connected to the stationary rail. One end of the threaded shaft is projected from the tunnel like-space to form an exposed end. A gear mechanism incorporated with the exposed end of the threaded shaft for transmitting a power of an electric motor to the threaded shaft is arranged outside of the coupled rail unit.

14 Claims, 2 Drawing Sheets

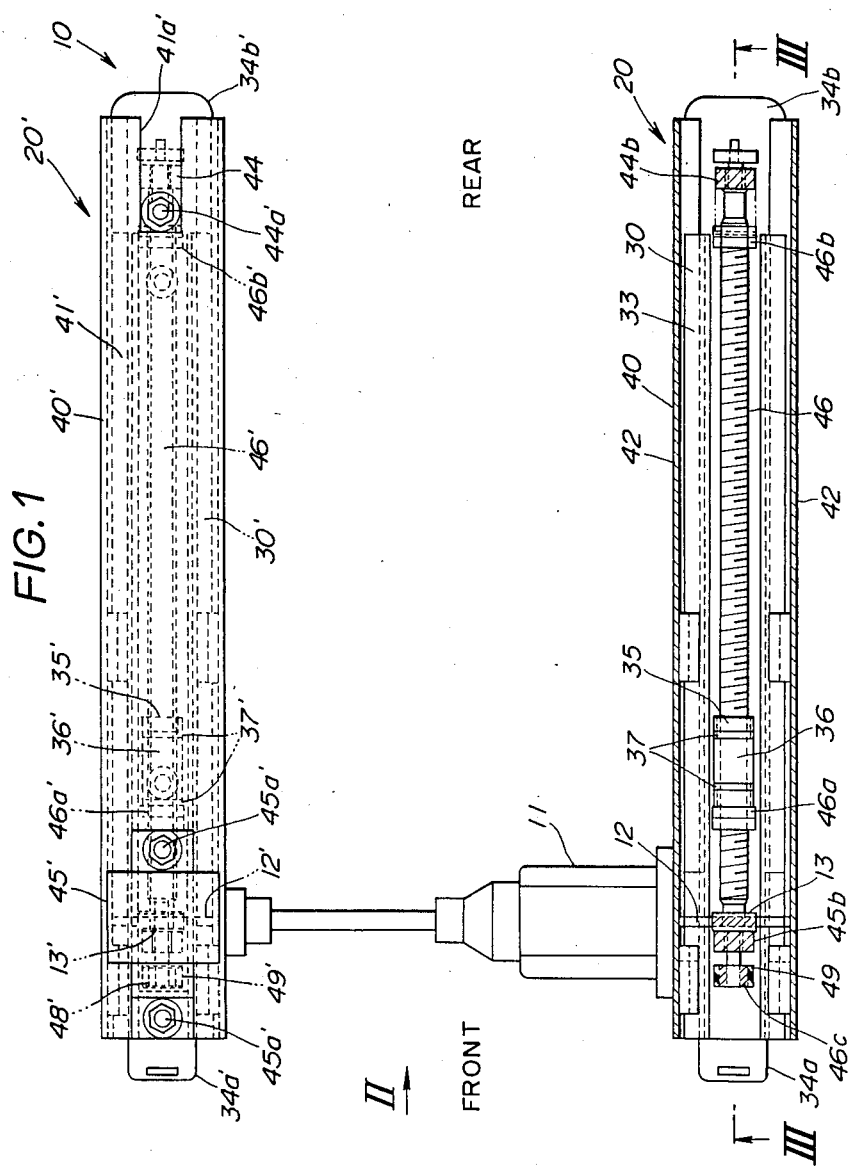

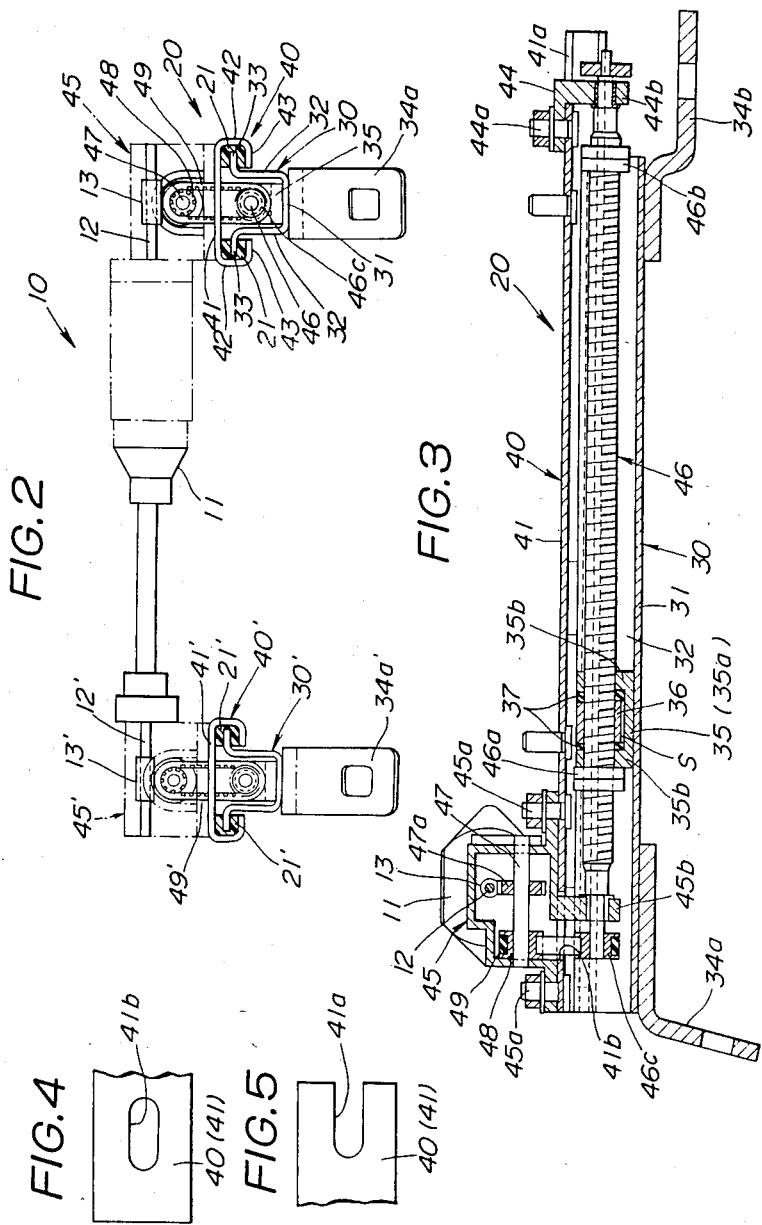

POWERED SEAT SLIDE DEVICE

BACKGROUND OF THE INVENTION

1. Field of the Invention.

The present invention relates in general to a seat slide device for sliding a seat to a desired position to provide a seat occupant with a comfortable sitting posture, and more particularly, the present invention is concerned with a powered seat slide device which slides the seat by the aid of a motor.

2. Description of the Prior Art

Hitherto, various kinds of powered seat slide devices have been proposed and put into practical use particularly in the field of motor vehicles. However, due to their inherencies, some of the conventional powered seat slide devices are compelled to have the unsightly gear mechanisms naked or exposed to the view thereby deteriorating the external appearances thereof. This has limited the industrial field where such powered seat slide devices are practically employed. One of the measures for solving such drawback is disclosed in Japanese Utility Model Second Provisional Publication No. 57-47225. In this measure, the gear mechanism is substantially entirely housed in an elongate tunnel-like space defined by the coupled stationary and movable rails. Because the unsightly gear mechanism is concealed by the rails, the external appearance of the seat slide device is improved. However, mounting almost all parts of the gear mechanism in the space brings about a need for increasing the size of the coupled rail unit. As is known, bulky construction of the seat slide device tends to not only increase the weight of the same but also raise the seat to such a height that a comfortable sitting posture is not taken by a seat occupant.

SUMMARY OF THE INVENTION

It is therefore an object of the present invention to provide a powered seat slide device which is free of the above-mentioned drawbacks.

According to the present invention, there is provided a powered seat slide device for sliding a seat on a floor to a desired position, which comprises two stationary rails extending on and along the floor in parallel with each other, two movable rails slidably and respectively engaged with said stationary rails and mounting thereon the seat, each movable rail and the associated stationary rail being assembled to define therebetween an elongate tunnel which extends along a common axis of the stationary and movable rails, a threaded shaft housed in the elongate tunnel and having both ends rotatably supported by one of the movable and stationary rails, at least one of the ends being projected outwardly from the elongate tunnel to form an exposed end, a nut received in the elongate tunnel and fixed to the other of the movable and stationary rails, the threaded shaft being operatively engaged with the nut so that rotation of the threaded shaft about its axis induces a longitudinal movement of the movable rail relative to the stationary rail, an electric motor mounted on the rail by which the threaded shaft is supported and having a drive shaft, and a gear mechanism arranged between the drive shaft of the electric motor and the exposed end of the threaded shaft to transmit rotation of the drive shaft to the threaded shaft.

BRIEF DESCRIPTION OF THE DRAWING

Other objects and advantages of the present invention will become apparent from the following description when taken in conjunction with the accompanying drawings, in which:

FIG. 1 is a partially cut plan view of a powered seat slide according to the present invention;

FIG. 2 is a view taken from the direction of the arrow "II" of FIG. 1;

FIG. 3 is a sectional view taken along the line III-—III of FIG. 1;

FIG. 4 is a plan view of an end of one of two movable rails secured to the seat; and FIG. 5 is a view similar to FIG. 4, but showing the other movable rail.

DETAILED DESCRIPTION OF THE INVENTION

Referring to the drawings, particularly FIG. 1, there is shown a powered seat side device 10 according to the present invention.

The powered seat slide device 10 comprises generally two, that is, left and right rail units 20 and 20' arranged in parallel on a vehicle floor (not shown) and an electric motor 11 mounted to the rail unit 20. As will be seen from FIGS. 1 and 2, the motor 11 has a drive shaft 12 passing therethrough, and the drive shaft 12 has both ends which are operatively connected to the rail units 20 and 20' in a manner as will be described hereinafter. Although not shown in the drawings, suitable cross beams are arranged on the two rail units 20 and 20' to support thereon a seat (not shown) The rail units illustrated in FIG. 1 assume their one extreme or rearmost position wherein the seat thereon assumes its rearmost position.

For facilitation of the description, the following explanation of the rail units 20 and 20' will be made only with respect to the rail unit 20. The parts of the other rail unit 20' are substantially the same in construction and configuration as those of the rail unit 20. Thus, for ease of understanding and description, the parts of the rail unit 20' will be indicated by the addition of "'(prime)" after each corresponding reference numeral.

As will be seen from FIG. 3, the rail unit 20 comprises a stationary rail 30 mounted on the vehicle floor and a movable rail 40 secured to a bottom portion of the seat (not shown). As will become apparent as the description proceeds, the movable rail 40 is slidably mounted on the stationary rail 30, so that the seat is movable in a fore-and-aft direction substantially horizontally over the vehicle floor.

As is seen from the right part of FIG. 2, the stationary rail 30 is of a flanged channel member which includes a bottom wall 31, parallel side walls 32 raised vertically from respective sides of the bottom wall 31 and flanges 33 extending outwardly from the tops of the respective side walls 32 and 32. As is well seen from FIG. 3, front and rear ends of the bottom wall 31 of the stationary rail 30 are respectively secured to mounting brackets 34a and 34b which are in turn connected at their root portions (not shown) to the vehicle floor.

Within the channel of the stationary rail 30, there is stationarily disposed a holder 35 which is secured to the bottom wall 31 of the rail 30. As will be understood from FIG. 3, the holder 35 is formed with bored end walls 35b and which are spaced in a direction parallel with the longitudinal axis of the stationary rail 30. A nut 36 is coaxially put between the bored end walls 35b and of the holder 35. In order to make integral connection between the nut 36 and the holder 35, there are employed elastic pieces 37 made of rubber materials or the like, each being tightly sandwiched between an end of the nut 36 and the corresponding bore end wall 35b. The connection of the nut 36 to the holder 35 is so made as to leave a predetermined small clearance "S" between the side surface of the nut 36 and a base wall 35a of the holder 35. The clearance "S" is sized to absorb a play of the nut 36 which would be caused by deformation of the elastic pieces 37 during a seat position adjustment which will be described hereinafter.

Referring back to FIG. 2, the movable rail 40 has a generally C-shaped cross section, which comprises a major flat wall 41, parallel side walls 42 and 42 extending downwardly from respective sides of the major flat wall 41 and flanges 43 extending inwardly, viz., toward each other from the lower ends of the side walls 42. As is seen from the drawing, upon coupling between the movable and stationary rails 40 and 30, the inwardly flanged side walls 42 embrace the outward flanges 33 of the stationary rail 30. The outward flanges 33 of the stationary rail 30 are equipped with plastic sliders 21 which are snugly and slidably received in respective channels defined by the inwardly flanged side walls 42 of the movable rail 40. With this, a smooth sliding movement of the movable rail 40 relative to the stationary rail 30 is achieved.

As is seen from FIG. 3, the rear end of the movable rail 40 is provided with a shaft holder 44 which is secured to the major flat wall 41 of the rail 40 by means of a bolt 44a and a nut. The shaft holder 44 has a bored supporting portion 44b which extends downward to cross the axis of the stationary rail 30, for the purpose which will become apparent hereinafter. The front end of the movable rail 40 is provided with a gear housing 45 which is secured to the major flat wall 41 by bolts 45a and nuts. The gear housing 45 has a bored supporting portion 45b which extends downward to cross the axis of the stationary rail 30 for the purpose which will be described hereinafter. As is seen from FIG. 5, the rear end of the major flat wall 41 of the movable rail 40 is formed with a cut 41a through which the bored supporting portion 44b of the shaft holder 44 passes. As is seen from FIG. 4, the front end of the major flat wall 41 of the movable rail 40 is formed with an oval opening 41b through which the bored supporting portion 45b of the gear housing 45 passes.

Rotatably supported by the bored supporting portions 44b and 45b of the shaft holder 44 and of the gear housing 45 is an elongate threaded shaft 46 which has diametrically reduced both end portions projected outwardly from the associated bored supporting portions 44b and 45b. As is seen from FIG. 3, the threaded shaft 46 is operatively engaged or meshed with the nut 36 while passing through the bored end walls 35b of the holder 35. Front and rear stoppers 46a and 46b, each being of double nuts or the like, are connected to front and rear portions of the threaded shaft 46, which are brought into contact with the respective bored end walls 35b of the fixed holder 35 during axial movement of the threaded shaft 46 relative to the fixed holder 35 as will be described in detail hereinafter.

As is best seen from FIG. 3, a gear pulley 46c is coaxially fixed to the outwardly projected front end of the threaded shaft 46 to rotate therewith. An intermediate shaft 47 is spanned between spaced portions of the gear housing 45 in a manner to rotate about its axis parallel with the axis of the threaded shaft 46. The intermediate shaft 47 has a worm wheel 47a fixed thereto, which is meshed with a worm 13 securely mounted on the drive shaft 12 of the electric motor 11. The intermediate shaft 47 has further a gear pulley 48 fixed thereto. The gear pulley 48 and the afore-mentioned gear pulley 46c are connected through a toothed timing belt 49 which passes through the oval opening 41b of the movable rail 40. Thus, it will be appreciated that the worm 13 on the drive shaft 12 of the motor 11, the worm wheel 47a, the gear pulley 48, the toothed timing belt 49 and the gear pulley 46c constitute a so-called a gear train for transmitting the rotation of the drive shaft 12 of the motor 11 to the threaded shaft 46. As may be understood from FIG. 2. The other rail unit 20' has substantially the same construction as the above-mentioned rail unit 20.

Assembly of the threaded shaft 46 to the rail unit 20 is generally made as follows:

First, the holder 35, the nut 36 and the elastic pieces 37 are assembled together. Then, the threaded shaft 46 is screwed into the aligned bores of the bored end walls 35b of the holder 35 and the nut 36. Then, the two stoppers 46a and 46b are connected to suitable portions of the threaded shaft 46. The threaded shaft 46 thus temporarily assembled is then inserted into an elongate tunnel-like space defined between the coupled stationary and movable rails 30 and 40, as will be understood from FIG. 2, having the diametrically reduced front end portion inserted in the bored supporting portion 45b of the gear housing 45 which has been bolted to the movable rail 40. The shaft holder 44 is then bolted to the rear end portion of the movable rail 40 to rotatably support the rear end portion of the threaded shaft 46, and then the nut-mounted holder 35 is bolted to the stationary rail 30. Of course, positioning of the parts may be carried out with the bolts 44a and 45a being loosened and upon completion of the positioning, the bolts 44a and 45a may be tightened. Then, the gear pulley 46c is fixed to the front end of the threaded shaft 46 and the toothed timing belt 49 is put around the pulley 46c and the gear pulley 48 which has been previously mounted in the gear housing 45.

In the following, operation of the powered seat slide device 10 of the invention will be described. For facilitation, the description will be made only with respect to the rail unit 20 because the other rail unit 20' operates in substantially the same manner, and the description will be commenced with respect to the condition illustrated in FIGS. 1 and 3 wherein the seat (not shown), viz., the movable rail 40 fixed thereto assumes its rearmost position.

In this condition, the electric motor 11 is at its standstill and the seat is substantially locked at the rearmost position. That is, under this condition, there is no relative movement between the threaded shaft 46 supported by the movable rail 40 and the nut 36 supported by the stationary rail 40. Even when a certain force is applied to the threaded shaft 46, by for example a passenger seated on the seat, in a direction parallel with the axis of the threaded shaft 46, the meshed engagement between the fixed nut 36 and the threaded shaft 46 prevents the threaded shaft 46 from making a movement relative to the fixed nut 36.

When now the motor 11 is energized to rotate the drive shaft 12 in a given direction, the rotation of the drive shaft 12 is transmitted through the gear train to the threaded shaft 46 thereby rotating the same about its axis. With this rotation, the threaded shaft 46 advances forward relative to the fixed nut 36, so that the movable rail 40 carrying the threaded shaft 46 is moved forward relative to the stationary rail 30. This means that the seat is moved forward.

When the seat comes to a desired position, the electric motor 11 is deenergized. With this, the seat is stationarily placed or locked at the desired position.

In the following, advantages of the present invention will be itemized:

Since, in the powered seat slide device of the present invention, the bulky gear mechanism is arranged outside of the rail unit 20 or 20' leaving only the threaded slim shaft 46 within the rail unit, there is no need for increasing the size of the rail unit. Furthermore, since the parts of the gear mechanism are substantially concealed by the gear housing 45 and the rail unit 20 or 20', the external appearance of the seat slide device 10 of the invention is not deteriorated.

In the invention, the electric motor 11 which is the tallest in the employed parts is positioned under a front portion of the seat on which the femurs of a seat occupant is seated. Because the femurs are light in weight as compared with the buttock of the seat occupant, the sag of the front portion of the seat due to sitting of the seat occupant thereon is relatively small thereby preventing the bottom of the seat front portion from interfering with the electric motor 11. This means that the sitting feeling of the seat occupant is not deteriorated by the presence of the upwardly projected electric motor 11.

Even when, due to application of a marked weight onto the seat, the movable rail 40 and thus the threaded shaft 46 is somewhat deformed or resiliently flexed relative to the fixed stationary rail 30, such deformation is absorbed by the elastic pieces 37 and 37 thereby keeping the meshed connection between the threaded shaft 46 and the nut 36 operative. The provision of the clearance "S" between the nut 36 and the holder 35 promotes this absorbing.

Even when, due to a vehicle collision or the like, a big force is applied to the seat slide device 10 in a direction to disconnect the movable rail 40 from the stationary rail 30, such disconnection is assuredly suppressed by the interlocking engagement held between the inward flanges 43 of the movable rail 40 and the outward flanges 33 of the stationary rail 30.

Although the foregoing description is directed to the embodiment in which the power drive is applied to both the left and right rail units 20 and 20', such drive may be applied to only one of the rail units.

Furthermore, if desired, the arrangement between the threaded shaft 46 and the nut 36 may be reversed to that as mentioned hereinabove. That is, the threaded shaft 46 may be supported by the stationary rail 30 and the nut 36 may be connected to the movable rail 40.

What is claimed is:

1. A powered seat slide device for sliding a seat over a floor to a desired position, comprising:
   two stationary rails extending on the floor in parallel with each other;
   two movable rails slidably and respectively coupled with said stationary rails and mounting thereon the seat, each movable rail and the associated stationary rail being assembled to define therebetween an elongate tunnel which extends along a common axis of the stationary and movable rails;
   a threaded shaft housed in said elongate tunnel and having both ends which are rotatably supported by said movable rail through respective end holders, at least one of said ends of the threaded shaft being projected outwardly from the associated end holder to form an exposed end;
   a nut received in said elongate tunnel and fixed to the stationary rail, said threaded shaft being operatively engaged with said nut so that rotation of said threaded shaft about its axis induces an axial movement of the movable rail relative to the stationary rail;
   an electric motor mounted on the movable rail and having a drive shaft; and
   a gear mechanism arranged between said drive shaft of the electric motor and said exposed end of the threaded shaft thereby to transmit rotation of the drive shaft to the threaded shaft.

2. A powered seat slide device as claimed in claim 1, in which said threaded shaft is supported by said movable rail, and said nut is connected to said stationary rail.

3. A powered seat slide device a claimed in claim 2, further comprising a gear housing which is securely mounted on said movable rail to house therein essential parts of said gear mechanism.

4. A powered seat slide device as claimed in claim 3, in which said gear mechanism comprises a first gear pulley coaxially fixed to said exposed end of the threaded shaft and a worm coaxially and securely disposed about said drive shaft of the electric motor, said first gear pulley and said worm being operatively connected through remaining parts of said gear mechanism.

5. A powered seat slide device for sliding a seat on a floor to a desired position, comprising:
   two stationary rails extending on and along the floor in parallel with each other;
   two movable rails slidably and respectively coupled with said stationary rails and mounting thereon the seat, each movable rail and the associated stationary rail being assembled to define therebetween an elongate tunnel which extends along a common axis of the stationary and movable rails;
   a threaded shaft housed in said elongate tunnel and having both ends which are rotatably supported by said movable rail;
   a nut received in said elongate tunnel and fixed to the stationary rail, said threaded shaft being operatively engaged with said nut so that rotation of the threaded shaft about its axis induces a longitudinal movement of the movable rail relative to the stationary rail;
   an electric motor mounted on said movable rail and having a drive shaft;
   a gear mechanism arranged between said drive shaft of the electric motor and one of the ends of said threaded shaft to transmit rotation of the drive shaft to the threaded shaft; and
   a gear housing which is securely mounted on said movable rail to house therein essential parts of said gear mechanism;
   wherein said hear mechanism includes a worm coaxially and securely disposed on said drive shaft of the electric motor, a worm wheel meshed with said worm and coaxially and securely disposed on a rotation shaft which is spanned between spaced portions of said gear housing to rotate about its axis, a second gear pulley coaxially and securely disposed on said rotation shaft, a first gear pulley coaxially connected to said end of the threaded shaft, and a timing belt put around said first and second gear pulleys.

6. A powered seat slide device as claimed in claim 5, in which said both ends of the threaded shaft are rotatably supported by respective end holders which are secured to spaced portions of said movable rail.

7. A powered seat slide device as claimed in claim 6, in which said both ends of the threaded shaft are reduced in diameter and beared by bores formed in said holders.

8. A powered seat slide device as claimed in claim 7, in which said threaded shaft has thereon two stoppers connected thereto which are brought into contact with the fixed nut when a longitudinal movement of said threaded shaft is carried out relative to said fixed nut.

9. A powered seat slide device as claimed in claim 8, in which said nut is snugly held by a nut holder which is secured to said stationary rail.

10. A powered seat slide device as claimed in claim 9, in which said nut holder has spaced end walls which are bored, the bored end walls snugly and coaxially locating therebetween said nut with an interposal of an elastomeric piece between each end of said nut and the associated bored end wall, said threaded shaft being passed through the aligned bores of said bored end walls and said nut while meshing with the internal thread of said nut.

11. A powered seat slide device as claimed in claim 10, in which the mouting of said nut to said nut holder is so made as to provide a given space between a base portion of the nut holder and the side surface of the nut.

12. A powered seat slide device as claimed in claim 11, in which said rotation shaft has a rotation axis which is parallel with the axis of said threaded shaft.

13. A powered seat slide device as claimed in claim 12, in which one of said end holders is integral with said gear housing.

14. A powered seat slide device as claimed in claim 13, in which said movable rail is formed, at the position where said gear housing is mounted, with an opening through which said timing belt passes.

* * * * *